United States Patent Office 2,731,489
Patented Jan. 17, 1956

2,731,489

DINITRILES AND PROCESS FOR THEIR PREPARATION

Harry A. Stansbury, Jr., South Charleston, and Howard R. Guest, Charleston, W. Va., assignors to Union Carbide and Carbon Corporation, a corporation of New York No Drawing. Application April 28, 1954,
Serial No. 426,304

13 Claims. (Cl. 260—465.4)

This invention relates to new chemical compounds and to a process for their preparation. More particularly, the present invention relates to certain 2,3,7-trihydroxyoctane-1,8-dinitriles and their functional derivatives and to a method for their preparation.

The compounds to which the present invention relates have the following general formula:

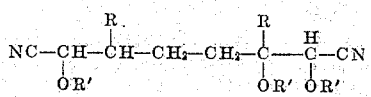

wherein R is a member selected from the class consisting of hydrogen and methyl radicals and R' is a member selected from the class consisting of hydrogen and acyl radicals containing from 2 to 10 carbon atoms. Examples of the novel class of compounds of the present invention are: 2,3,7-trihydroxyoctane-1,8-dinitrile; 3,6-dimethyl-2,3,7-trihydroxyoctane-1,8-dinitrile; 2,3,7-trihydroxyoctane-1,8-dinitrile triacetate; 3,6-dimethyl-2,3,7-trihydroxyoctane-1,8-dinitrile triacetate; 2,3,7-trihydroxyoctane-1,8-dinitrile tri(2-ethylhexanoate) and 3,6-dimethyl-2,3,7-trihydroxyoctane-1,8-dinitrile tri(2-ethylhexanoate).

We have discovered that 2-hydroxyadipaldehyde and 2,5-dimethyl-2-hydroxyadipaldehyde each react with hydrogen cyanide in the presence of a basic catalyst to form novel and useful dicyanohydrins having the general formula:

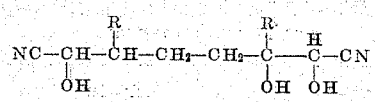

wherein R is a member selected from the class consisting of hydrogen and methyl groups. Members of this class of compounds comprise 2,3,7-trihydroxyoctane-1,8-dinitrile (2-hydroxyadipaldehyde dicyanohydrin) and 3,6-dimethyl-2,3,7-hydroxyoctane-1,8-dinitrile (2,5-dimethyl-2-hydroxyadipaldehyde dicyanohydrin).

While basic catalysts such as pyridine, ethylmethylpyridine, triethylamine and tributylamine may be used to catalyze the reaction, alkali metal cyanides are preferred. The catalyst may be present in an amount of from about 0.01 per cent to about 2.0 per cent by weight of the reaction mixture, but is preferably present in an amount of from about 0.1 per cent to about 0.5 per cent by weight of the reaction mixture.

The reaction may be conducted at a temperature of from about —10° C. to about 60° C., and preferably from about 20° C. to about 40° C. and a pressure of from about 5 p. s. i. a. to about 150 p. s. i. a., and preferably at atmospheric pressure, for a period of from about 60 minutes to about 600 minutes.

We have further discovered that these novel nitriles can be esterified with anhydrides containing from 4 to 20 carbon atoms, such as acetic anhydride or 2-ethylhexanoic anhydride to produce a novel class of compounds having the following general formula:

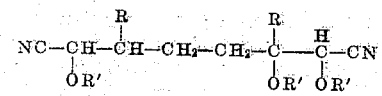

wherein R is a member selected from the class consisting of hydrogen and methyl radicals and R' is an acyl radical containing from 2 to 10 carbon atoms. Examples of this class of compounds are 2,3,7-trihydroxyoctane-1,8-dinitrile triacetate; 3,6-dimethyl-2,3,7-trihydroxyoctane-1,8-dinitrile triacetate; 2,3,7-trihydroxy-1,8-dinitrile tri(2-ethylhexanoate) and 3,6-dimethyl-2,3,7-trihydroxyoctane-1,8-dinitrile tri(2-ethylhexanoate).

The esterification reaction may be conducted at a temperature of from about 20° C. to about 200° C., and preferably from about 100° C. to about 130° C., and a pressure of from about 5 p. s. i. a. to about 150 p. s. i. a., and preferably at atmospheric pressure, for a period of from about 30 minutes to about 600 minutes. The reaction should be conducted in the presence of a strong acid catalyst, such as concentrated hydrochloric acid; other catalysts which may be used are sulfuric acid, sulfoacetic acid, hydrobromic acid and toluenesulfonic acid.

The crude esters may be recovered from the esterification mixture by a suitable fractionation method, such as distillation in a molecular still.

These novel dicyanohydrins are useful intermediates for the synthesis of various chemical compounds. For example, they can be hydrolyzed with mineral acids to form the corresponding organic acids and reacted with mineral acids in the presence of alcohols to form the corresponding esters. The esters of our invention are also useful as plasticizers for certain synthetic organic resins and are of particular value as plasticizers for vinyl chloride-vinyl acetate copolymers and vinyl chloride-acrylonitrile copolymers.

The following examples are given to illustrate our invention.

EXAMPLE I

A mixture of 1.0 gram of potassium cyanide catalyst (0.015 equivalents) and 59 grams of hydrogen cyanide (2.2 moles) was stirred at 20°–25° C. while a solution of 158 grams of 2,5-dimethyl-2-hydroxyadipaldehyde (1 mole) in 79 grams of dioxane solvent was fed over a period of 35 minutes. After the reaction mixture was stirred at 25° C. for 30 minutes, it was acidified with 2 cc. of concentrated hydrochloric acid (0.02 equivalent) to produce 3,6-dimethyl-2,3,7-trihydroxyoctane-1,8-dinitrile (2,5-dimethyl-2-hydroxyadipaldehyde dicyanohydrin).

A solution of 1 cc. of concentrated hydrochloric acid catalyst in 612 grams of acetic anhydride (6 moles) was stirred at 105°–120° C. while the crude dicyanohydrin was fed over a period of 55 minutes. The mixture was distilled under reduced pressure to obtain 3,6-dimethyl-2,3,7-trihydroxyoctane-1,8-dinitrile triacetate having the properties recorded in Table I. The triacetate, which is a very viscous liquid at 25° C., was formed with 77 per cent yield and 90 per cent efficiency based on 2,5-dimethyl-2-hydroxyadipaldehyde.

Table I.—*3,5-dimethyl-2,3,7-trihydroxyoctane-1,8-dinitrile triacetate*

|  | Mol. Wt. | Percent C | Percent H | Percent N | Boiling Range at 2 mm., °C. | Sp. G., 45°/20° | $n_D^{30}$ |
|---|---|---|---|---|---|---|---|
| Observed | [1] 302 | 58.1 | 7.2 | 8.5 | 180-188 | 1.090 | 1.4508 |
| Theoretical | 338 | 56.8 | 6.5 | 8.3 | | | |

[1] Determined by the Menzies Wright method.

The triacetate was found to be a plasticizer for both a high molecular weight copolymer of 97 per cent vinyl chloride and 3 per cent vinyl acetate and for a copolymer of 60 per cent vinyl chloride and 40 per cent acrylonitrile. When one part by weight of the triacetate was milled with 1.5 parts of either resin, a clear, flexible sheet was produced. There was no evidence of "sweat-out" after six weeks.

EXAMPLE II

The dicyanohydrin was prepared using the same charge and procedure as described in Example I. While 1080 grams of 2-ethylhexanoic anhydride (4 moles) were stirred at 100° C.–105° C., the acidified crude dicyanohydrin was fed over a period of 35 minutes. The reaction mixture was stripped to a kettle temperature of 220° C. at 4 mm. to remove 2-ethylhexanoic acid formed in the reaction and excess 2-ethylhexanoic anhydride. The residue (380 grams) was distilled in a molecular still to obtain the tri(2-ethylhexanoate) having the properties recorded in Table II. The yield was 46 per cent based on 2,5-dimethyl-2-hydroxyadipaldehyde, while the efficiency was about 80 per cent.

Table II.—*3,6-dimethyl-2,3,7-trihydroxyoctane-1,8-dinitrile tri(2-ethylhexanoate)*

|  | Mol. Wt. | Percent C | Percent H | Percent N | Molecular Distillation at 5 microns, °C.[2] | Sp. G., 20°/20° | $n_D^{30}$ |
|---|---|---|---|---|---|---|---|
| Observed | [1] 511 | 68.6 | 9.7 | 5.0 | 99 | 0.948 | 1.4531 |
| Theoretical | 590 | 69.2 | 9.8 | 4.7 | | | |

[1] Determined by the Menzies-Wright method.
[2] Temperature of the residue leaving the heated rotor of the still. The term, boiling point, cannot be used in describing a molecular distillation.

EXAMPLE III

A mixture of 130 grams of dioxane solvent, 18 cc. of water (1 mole) and 0.5 cc. of concentrated hydrochloric acid (.005 equivalent) was stirred at 24° C.–32° C. while 112 grams of acrolein dimer (1 mole) were added over a period of 30 minutes. The mixture was stirred for 30 minutes longer at 26° C.– 30° C. to complete the hydrolysis to 2-hydroxyadipaldehyde.

A mixture of 1.0 gram of potassium cyanide catalyst (0.015 equivalent) and 59 grams of hydrogen cyanide (2.2 moles) was stirred at 20° C.–25° C. while the 2-hydroxyadipaldehyde solution was fed over a period of 25 minutes. After the solution was stirred at 25° C. for 25 minutes, it was acidified with 2 cc. of concentrated hydrochloric acid (0.02 equivalent) to produce 2,3,7-trihydroxyoctane-1,8-dinitrile (2-hydroxyadipaldehyde dicyanohydrin).

The crude dicyanohydrin solution was fed over a period of 15 minutes to a stirred mixture of 1 cc. of concentrated hydrochloric acid and 612 grams of acetic anhydride (6 moles) at 101° C.–110° C. The mixture was stripped rapidly to a kettle temperature of 185° C. at 9 mm. There was obvious decomposition during this operation. The crude residue weighed 193 grams, which corresponded to a yield of 62 per cent based on acrolein dimer. This residue was distilled in a molecular still to obtain the product described in Table III. Even under the mild conditions of the molecular distillation, there was some decomposition to volatile products, one of which was hydrogen cyanide.

Table III.—*2,3,7-trihydroxyoctane-1,8-dinitrile triacetate*

|  | Mol. Wt. | Percent C | Percent H | Percent N | Molecular Distillation at 400 microns, °C.[2] | Sp. G., 20°/20° | $n_D^{30}$ |
|---|---|---|---|---|---|---|---|
| Observed | [1] 252 | 54.5 | 6.0 | 7.1 | 100 | 1.162 | 1.4500 |
| Theoretical | 310 | 54.2 | 5.8 | 9.0 | | | |

[1] Determined by the Menzies-Wright method.
[2] Temperature of the residue leaving the heated rotor of the still. The term, boiling point, cannot be used in describing a molecular distillation.

EXAMPLE IV

A mixture of 130 grams of dioxane solvent, 18 cc. of water (1 mole) and 0.5 cc. of concentrated hydrochloric acid (0.005 equivalent) was stirred at 24° C.–30° C. while 112 grams of acrolein dimer (1 mole) were fed dropwise over a period of 20 minutes. After the solution was stirred for 45 minutes, it was analyzed with alkaline hydroxylamine to find that 0.73 mole (73 per cent yield) of 2-hydroxyadipaldehyde were present. After 1.5 hours longer at 25° C.–30° C., analysis of the solution indicated only .69 mole (69 per cent yield) of 2-hydroxyadipaldehyde were present.

A mixture of 1.0 gram of potassium cyanide (0.015 equivalent) and 59 grams of hydrogen cyanide (2.2 moles) was stirred at 20° C.– 24° C. while the 2-hydroxyadipaldehyde solution was fed over a period of 30 minutes. After a 15 minute reaction period at 23° C., the mixture was acidified with 2 cc. of concentrated hydrochloric acid (0.02 equivalent) to produce 2-hydroxyadipaldehyde dicyanohydrin.

While 1080 grams of 2-ethylhexanoic anhydride (4 moles) were stirred at 106° C., the acidified crude dicyanohydrin solution was fed over a period of 20 minutes. The reaction mixture was stripped to a kettle temperature of 210° C., at 4 mm. to remove 2-ethylhexanoic acid and excess 2-ethylhexanoic anhydride. The crude residue weighed 273 grams which corresponded to a yield of 49 per cent based on acrolein dimer. The residue was distilled in a molecular still to obtain 2,3,7-trihydroxy-1,8-dinitrile-tri(2-ethylhexanoate) having the properties reported in Table IV.

Table IV.—*2,3,7-trihydroxyoctane-1,8-dinitrile tris(2-ethylhexanoate)*

|  | Mol. Wt. | Percent C | Percent H | Percent N | Molecular Distillation at 4 microns, °C.[2] | Sp. G., 20°/20° | $n_D^{30}$ |
|---|---|---|---|---|---|---|---|
| Observed | [1] 513 | 67.2 | 9.5 | 4.8 | 103 | 1.006 | 1.4559 |
| Theoretical | 562 | 68.3 | 9.6 | 5.0 | | | |

[1] Determined by the Menzies-Wright method.
[2] Temperature of the residue leaving the heated rotor of the still. The term, boiling point, cannot be used in describing a molecular distillation.

We claim:
1. Chemical compounds having the formula:

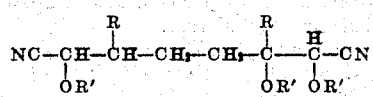

wherein R is a member selected from the class consisting of hydrogen and methyl radicals and R' is a member selected from the class consisting of hydrogen and aliphatic acyl radicals containing from 2 to 10 carbon atoms.

2. Chemical compounds having the formula:

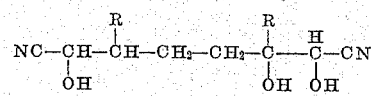

wherein R is a member selected from the class consisting of hydrogen and methyl radicals.

3. A chemical compound having the formula:

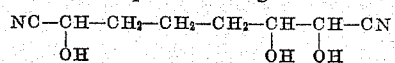

4. A chemical compound having the formula:

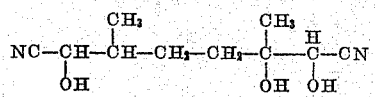

5. Chemical compounds having the formula:

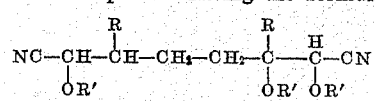

wherein R is a member selected from the class consisting of hydrogen and methyl radicals and R' is a member selected from the class consisting of aliphatic acyl radicals containing from 2 to 10 carbon atoms.

6. Chemical compounds having the formula:

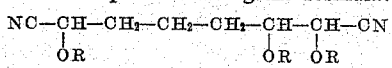

wherein R is an aliphatic acyl radical containing from 2 to 10 carbon atoms.

7. A chemical compound having the formula:

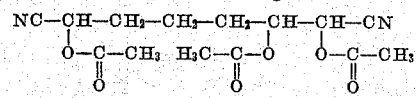

8. A chemical compound having the formula:

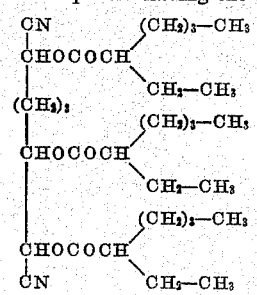

9. Chemical compounds having the formula:

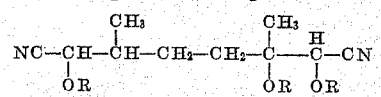

wherein R is an aliphatic acyl radical containing from 2 to 10 carbon atoms.

10. A chemical compound having the formula:

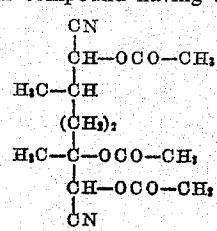

11. A chemical compound having the formula:

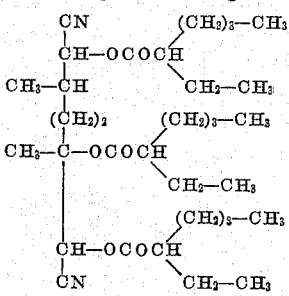

12. The process of producing a compound having the formula:

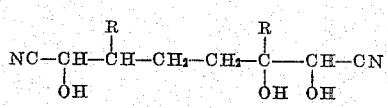

wherein R is a member selected from the class consisting of hydrogen and methyl radicals, which comprises reacting a compound having the general formula:

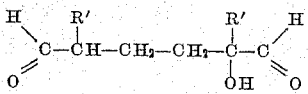

wherein R' is a member selected from the class consisting of hydrogen and methyl radicals, with hydrogen cyanide.

13. The process of producing a compound having the formula:

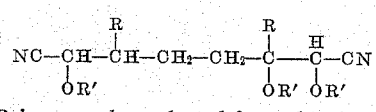

wherein R is a member selected from the class consisting of hydrogen and methyl radicals and R' is an aliphatic acyl radical containing from 2 to 10 carbon atoms, which comprises reacting a compound having the general formula:

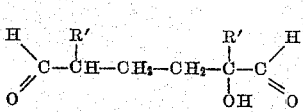

wherein R' is a member selected from the class consisting of hydrogen and methyl radicals, with hydrogen cyanide, and reacting the resulting intermediate dicyanohydrin with an anhydride containing from 4 to 20 carbon atoms.

References Cited in the file of this patent

UNITED STATES PATENTS

| | | |
|---|---|---|
| 1,984,415 | Macallum | Dec. 18, 1934 |
| 2,396,292 | Slotterbeck | Mar. 12, 1946 |
| 2,483,853 | Smith et al. | Oct. 4, 1949 |